(12) United States Patent
Murata (10) Patent No.: US 12,030,345 B2
(45) Date of Patent: Jul. 9, 2024

(54) PNEUMATIC TIRE

(71) Applicant: The Yokohama Rubber Co., LTD., Tokyo (JP)

(72) Inventor: Takahisa Murata, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 671 days.

(21) Appl. No.: 16/478,831

(22) PCT Filed: Jan. 16, 2018

(86) PCT No.: PCT/JP2018/001005
§ 371 (c)(1),
(2) Date: Jul. 17, 2019

(87) PCT Pub. No.: WO2018/135484
PCT Pub. Date: Jul. 26, 2018

(65) Prior Publication Data
US 2020/0055345 A1 Feb. 20, 2020

(30) Foreign Application Priority Data
Jan. 17, 2017 (JP) ................................. 2017-006134

(51) Int. Cl.
*B60C 11/01* (2006.01)
*B60C 11/11* (2006.01)
(Continued)

(52) U.S. Cl.
CPC ............... *B60C 11/01* (2013.01); *B60C 11/11* (2013.01); *B60C 2011/0362* (2013.01); *B60C 2011/1361* (2013.01); *B60C 2200/14* (2013.01)

(58) Field of Classification Search
CPC ..... B60C 2011/1361; B60C 2011/0362; B60C 11/01; B60C 11/11; B60C 11/13; B60C 2200/14
See application file for complete search history.

(56) References Cited

U.S. PATENT DOCUMENTS

D791,687 S * 7/2017 Sueyoshi ..................... D12/579
D811,320 S * 2/2018 Kuwahara .................... D12/602
(Continued)

FOREIGN PATENT DOCUMENTS

JP 02197402 A * 8/1990 ............. B60C 11/12
JP 11291718 A * 10/1999 ....... B60C 2011/013
(Continued)

OTHER PUBLICATIONS

Machine translation of JP11-291718 (no date).*
International Search Report for International Application No. PCT/JP2018/001005 dated Apr. 24, 2018, 3 pages, Japan.

*Primary Examiner* — Justin R Fischer
*Assistant Examiner* — Philip N Schwartz
(74) *Attorney, Agent, or Firm* — Thorpe North & Western (57) ABSTRACT

Provided is a pneumatic tire. In shoulder regions of a tread portion, as shoulder blocks, inner blocks and outer blocks, which have outer edges in a tire lateral direction at different positions on a tread contact surface, are alternately disposed in a tire circumferential direction. In shoulder grooves disposed between the inner blocks and outer blocks adjacent to each other in the tire circumferential direction, groove bottom protrusions, which extend from a laterally inner side to a laterally outer side in the tire lateral direction along the shoulder grooves over the positions of the outer edges of the inner blocks, are provided. Broad width portions having a relatively broad protrusion width of the groove bottom protrusions are disposed on a laterally outer side in the tire lateral direction with respect to the outer edges of the inner blocks in a front view.

10 Claims, 3 Drawing Sheets

(51) Int. Cl.
*B60C 11/03* (2006.01)
*B60C 11/13* (2006.01)

(56) References Cited

U.S. PATENT DOCUMENTS

| | | | |
|---|---|---|---|
| 2005/0103416 A1* | 5/2005 | Rooney | B60C 11/0316 152/209.16 |
| 2008/0210355 A1 | 9/2008 | Harvey et al. | |
| 2013/0139936 A1 | 6/2013 | Ohara | |

FOREIGN PATENT DOCUMENTS

| | | |
|---|---|---|
| JP | H11-291718 | 10/1999 |
| JP | 2013-119277 | 6/2013 |

\* cited by examiner

PNEUMATIC TIRE

TECHNICAL FIELD

The present technology relates to a pneumatic tire suitable as a tire used for driving on unpaved roads, and particularly relates to a pneumatic tire capable of providing driving performance on unpaved roads and cut-resistance performance in a compatible manner to a high degree.

BACKGROUND ART

In general, as a pneumatic tire used for driving on unpaved roads such as an uneven ground surface, a muddy ground surface, a snowy road, a sandy ground surface, and a rocky ground surface, a tire with a tread pattern, which mainly includes lug grooves and blocks with a large number of edge components and has a large groove area, is adopted. Such tire obtains traction performance by biting mud, snow, sand, ballast, rocks, and the like on road surfaces (hereinafter, collectively referred to as "mud and the like"), and prevents the grooves from being clogged with mud and the like so as to improve driving performance on unpaved roads (for example, see Japan Unexamined Patent Publication No. 2013-119277).

However, such tire has a large groove area even in shoulder portions, and hence ballast and rocks on road surfaces are liable to enter the grooves formed in the shoulder portions. As a result, there is a problem in that groove bottoms are liable to be damaged (unsatisfactory cut-resistance performance). Thus, a measure to improve driving performance on unpaved roads (particularly on muddy roads and rocky ground surfaces) by causing the grooves to effectively bite mud and the like without degrading cut-resistance performance and to provide driving performance and cut-resistance performance in a well-balanced, compatible manner is required.

SUMMARY

The present technology provides a pneumatic tire, which is suitable as a tire used for driving on unpaved roads and is capable of providing driving performance on unpaved roads and cut-resistance performance in a compatible manner to a high degree.

A pneumatic tire according to an embodiment of the present technology includes a tread portion extending in a tire circumferential direction and having an annular shape, a pair of sidewall portions disposed on both sides of the tread portion, and a pair of bead portions disposed on an inner side of the sidewall portions in a tire radial direction. A plurality of shoulder blocks are provided in shoulder regions in the tread portion, and the plurality of shoulder blocks include inner blocks and outer blocks that have outer edges at different positions in a tire lateral direction on a tread contact surface. The inner blocks and the outer blocks are disposed alternately in the tire circumferential direction. Groove bottom protrusions are disposed in shoulder grooves disposed between the inner blocks and the outer blocks adjacent to each other in the tire circumferential direction, the groove bottom protrusions project from groove bottom of the shoulder grooves and extend from a laterally inner side to a laterally outer side in the tire lateral direction along the shoulder grooves over the positions of the outer edges of the inner blocks. The groove bottom protrusions include narrow width portions having a relatively narrow protrusion width and broad width portions having a relatively broad protrusion width. The broad width portions are present on the laterally outer side in the tire lateral direction with respect to the outer edges of the inner blocks.

In the embodiment of the present technology, the shoulder blocks include the inner blocks and the outer blocks as described above. Thus, in addition to obtaining traction performance exerted by recesses and protrusions that are formed by the plurality of shoulder blocks and the shoulder grooves, even a relatively large rock or the like can be gripped by a space formed by the outer blocks and the inner blocks recessed inward in the tire lateral direction with respect to the outer blocks. As a result, traction performance can be improved. Meanwhile, the groove bottom protrusions are provided to the shoulder grooves, and the broad width portions are disposed at the above-mentioned positions. Thus, mud and the like can easily be discharged by the groove bottom protrusions, and the groove bottom protrusions protect the groove bottoms. As a result, cut-resistance performance can be improved.

In the embodiment of the present technology, on outer side surfaces in the tire lateral direction of the inner blocks and the outer blocks, shallow grooves that are bent and extend along the tire lateral direction are preferably disposed. By providing the shallow grooves as described above, edge components are increased, which is advantageous in improving traction performance. Note that, the "shallow grooves" in the embodiment of the present technology are grooves shallower than the other grooves formed between the adjacent blocks (having a groove depth of, for example, from 8.0 mm to 20.0 mm), and have a groove depth of, for example, from 1.0 mm to 3.0 mm.

In the embodiment of the present technology, a distance W1 from a tire equator to the outer edges of the inner blocks in the tire lateral direction is preferably from 88% to 96% of a distance W2 from the tire equator to the outer edges of the outer blocks in the tire lateral direction. By setting the positions of the outer edges of the inner blocks and the outer blocks in the tire lateral direction as described above, a rock can easily be gripped as described above while securing block rigidity and obtaining sufficient cut-resistance performance, which is advantageous in providing traction performance and cut-resistance performance in a compatible manner.

In the embodiment of the present technology, a protrusion width Wb of the broad width portion is preferably from 1.5 times to 3.0 times as large as the protrusion width Wa of the narrow width portion. By setting the protrusion width as described above, discharge of mud and the like is effectively promoted in the ground contact region, and cut-resistance performance is improved outside the ground contact region (on the laterally outer side with respect to the outer edges of the inner blocks in the tire lateral direction). With this, discharge performance and the cut-resistance performance can be provided in a compatible manner to a high degree.

In the embodiment of the present technology, the length Lb in the tire lateral direction of the broad width portions is preferably equal to or larger than 50% of the distance D from the outer edges in the tire lateral direction of the inner blocks to the terminal edges of the outer blocks. By securing the length of the broad width portions sufficiently, excellent cut-resistance performance can be exerted effectively.

In the embodiment of the present technology, a projection height H of the groove bottom protrusions is preferably from 1.0 mm to 3.0 mm. By optimizing the shape of the groove bottom protrusions (projection height), discharge performance of mud and the like, driving performance on unpaved roads (particularly, mud performance), and cut-resistance performance can be exerted in a well-balanced manner.

In the embodiment of the present technology, the respective dimensions (lengths and angles) are measured when the tire is mounted on a regular rim and inflated to a regular internal pressure, placed vertically upon a flat surface, and loaded with a regular load. Note that, "road contact surface" of each block is a surface portion of each block that actually comes into contact with a flat surface on which the tire is placed under this state, and excludes, for example, chamfered portions that do not actually come into contact. Further, "ground contact edges" are both edges in the tire axial direction under this state. "Regular rim" is a rim defined by a standard for each tire according to a system of standards that includes standards on which tires are based, and refers to a "standard rim" in the case of the Japan Automobile Tyre Manufacturers Association Inc. (JATMA), refers to a "design rim" in the case of the Tire and Rim Association, Inc. (TRA), and refers to a "measuring rim" in the case of the European Tyre and Rim Technical Organisation (ETRTO). "Regular internal pressure" is an air pressure defined by standards for each tire according to a system of standards that includes standards on which tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. "Regular internal pressure" is 180 kPa for a tire on a passenger vehicle. "Regular load" is a load defined by a standard for each tire according to a system of standards that includes standards on which tires are based, and refers to a "maximum load capacity" in the case of JATMA, refers to the maximum value in the table of "TIRE ROAD LIMITS AT VARIOUS COLD INFLATION PRESSURES" in the case of TRA, and refers to "LOAD CAPACITY" in the case of ETRTO.

DETAILED DESCRIPTION

Configurations of embodiments of the present technology will be described in detail below with reference to the accompanying drawings.

Figure 1:
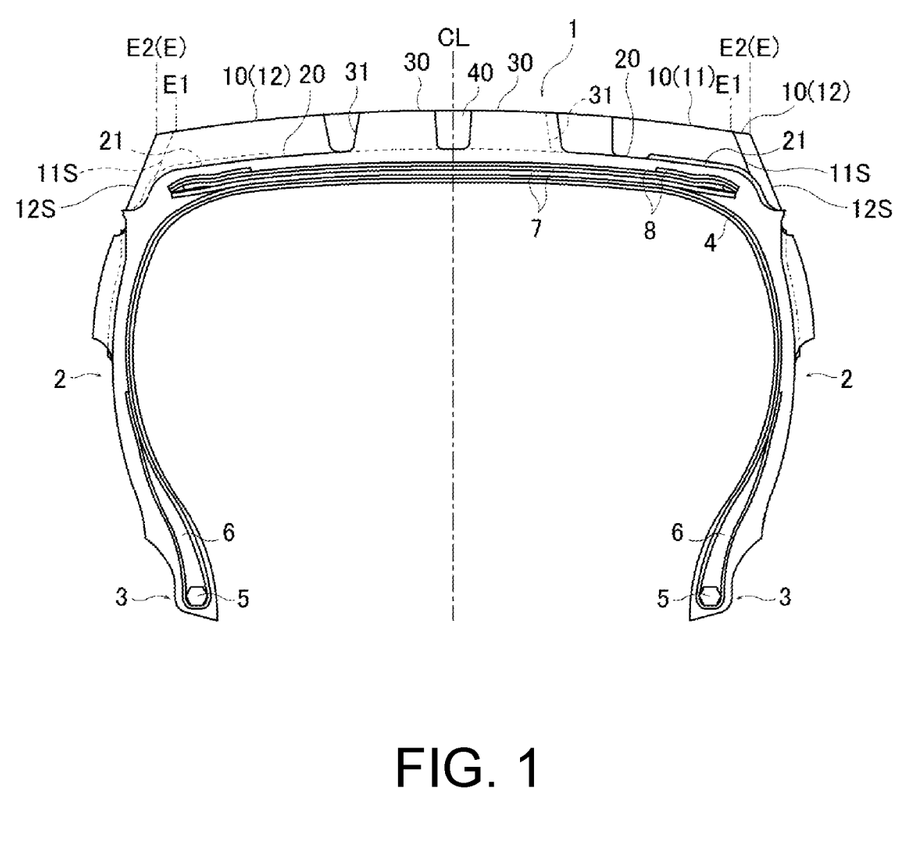
FIG. 1 is a meridian cross-sectional view of a pneumatic tire according to an embodiment of the present technology.

As illustrated in FIG. 1, the pneumatic tire of an embodiment of the present technology includes an annular tread portion 1 extending in the tire circumferential direction, a pair of sidewall portions 2 disposed on both sides of the tread portion 1, and a pair of bead portions 3 disposed inward of the sidewall portions 2 in the tire radial direction. Note that, the reference symbol CL in FIG. 1 denotes the tire equator, and the reference symbol E denotes a ground contact edge.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, bead fillers 6 are disposed on the periphery of the bead cores 5, and each bead filler 6 is enveloped by a main body portion and a folded back portion of the carcass layer 4. Meanwhile, in the tread portion 1, a plurality of belt layers 7 (two layers in FIG. 1) are embedded on the outer circumferential side of the carcass layer 4. The belt layers 7 each include a plurality of reinforcing cords that are inclined with respect to the tire circumferential direction, with the reinforcing cords of the different layers arranged in a criss-cross manner. In these belt layers 7, the inclination angle of the reinforcing cords with respect to the tire circumferential direction ranges from, for example, 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°.

The embodiment of the present technology may be applied to such a general pneumatic tire, however, the cross-sectional structure thereof is not limited to the basic structure described above.

Figure 2:
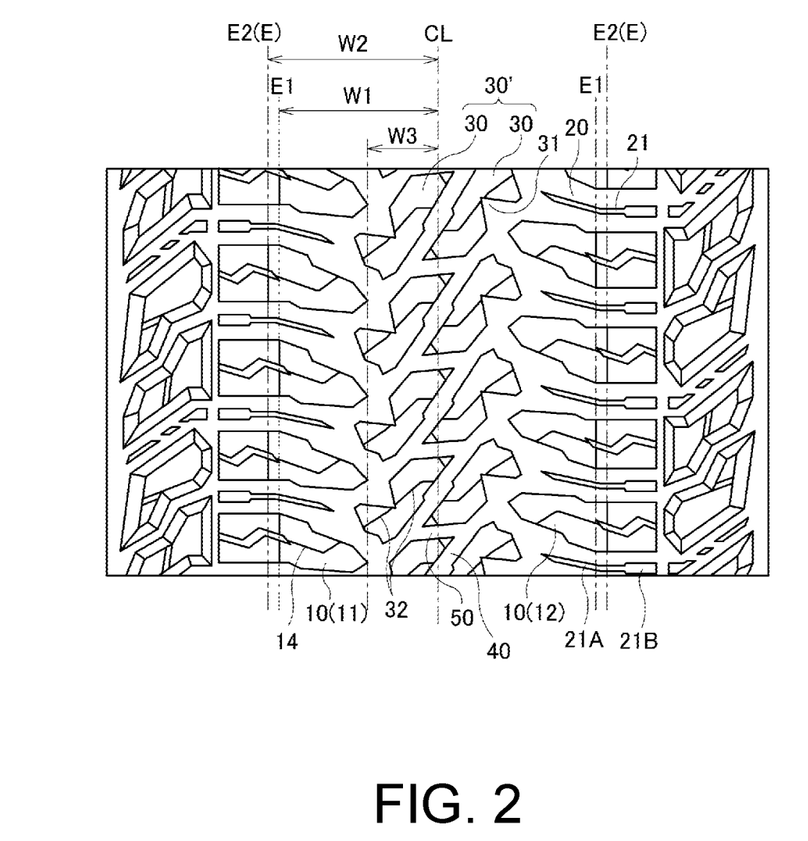
FIG. 2 is a developed view for illustrating a tread surface of the pneumatic tire according to the embodiment of the present technology.
Figure 3:
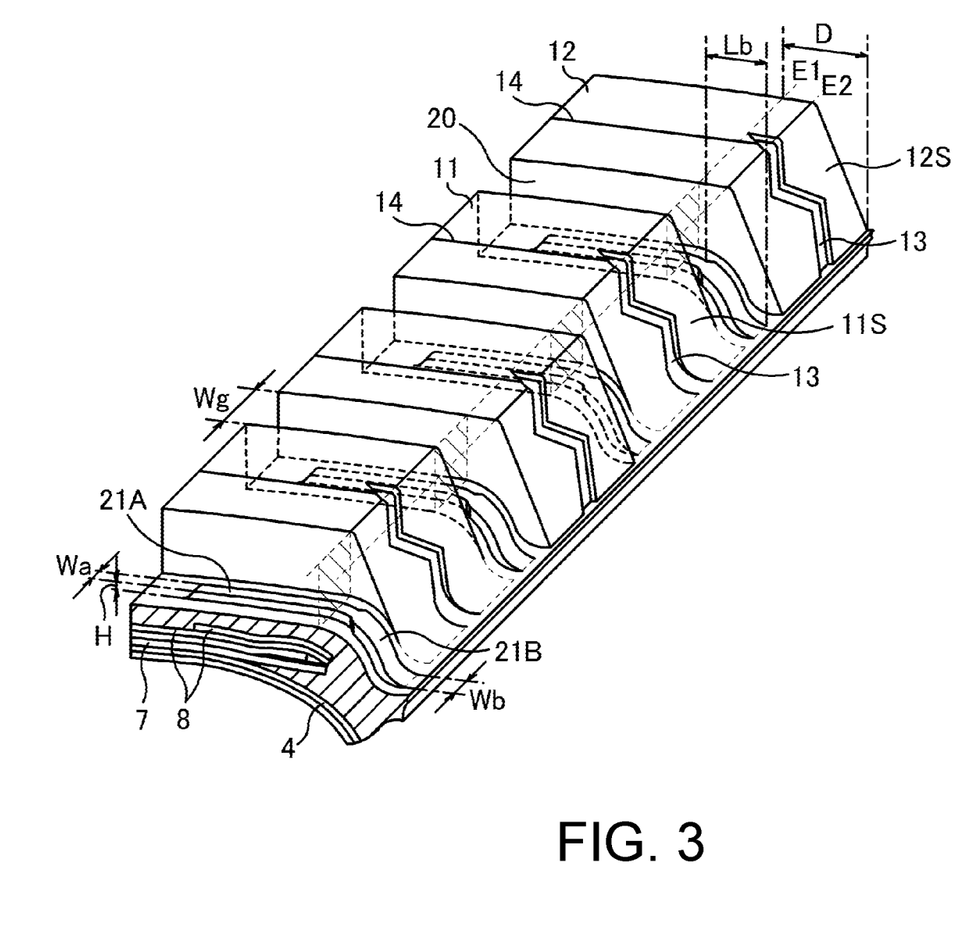
FIG. 3 is a schematic view for illustrating of a part of shoulder blocks in FIG. 2 in an enlarged manner.

As illustrated in FIG. 1 to 3, in shoulder regions of the outer surface of the tread portion 1, a plurality of shoulder blocks 10 are provided in the tire circumferential direction at an interval. The plurality of shoulder blocks 10 include inner blocks 11 and outer blocks 12 that include outer edges at different positions in a tire lateral direction in a tread contact surface. That is, when E1 denotes the outer edges of the inner blocks 11 in the tire lateral direction and E2 denotes the outer edges of the outer blocks 12 in the tire lateral direction, the outer edges E1 of the inner blocks 11 in the tire lateral direction is positioned inward in the tire lateral direction with respect to the outer edges E2 of the outer blocks 12 in the tire lateral direction. Note that, in the tread pattern in FIGS. 1 and 2, the land portions are not present on the outer side in the tire lateral direction with respect to the outer blocks 12. Thus, the outer edges E2 of the outer blocks 12 in the tire lateral direction match with a ground contact edge E of the entire tread portion 1. The inner blocks 11 and the outer blocks 12 are disposed alternately in the tire circumferential direction, and shoulder grooves 20 extending in the tire lateral direction are formed between the inner blocks 11 and the outer blocks 12.

Groove bottom protrusions 21, which project from each groove bottom of the shoulder grooves 20 and extend along the shoulder grooves 20, are provided in the shoulder grooves 20. The groove bottom protrusions 21 extend from the inner side in the tire lateral direction with respect to the outer edges E1 of the inner blocks 11 in the tire lateral direction to the outer side in the tire lateral direction with respect to the outer edges E1 of the inner blocks 11 in the tire lateral direction over the positions of the outer edges E1 of the inner blocks 11 in the tire lateral direction. The groove bottom protrusions 21 include narrow width portions 21A with a relatively narrow protrusion width and broad width portions 21B with a relatively broad protrusion width. The broad width portions 21B are present on the outer side in the tire lateral direction with respect to the outer edges E1 of the inner blocks 11 in the tire lateral direction.

As described above, the shoulder blocks 10 are formed of the inner blocks 11 and the outer blocks 12. Thus, in addition to traction performance obtained by recesses and protrusions of the plurality of shoulder blocks 10 and the plurality of shoulder grooves 20, traction performance can be improved because even a relatively large rock or the like can be gripped by recesses and protrusions caused by the different positions of the outer edges E1 and E2 of the inner blocks 11 and the outer blocks 12 in the tire lateral direction (particularly, a space formed by inner edges E1 of the inner blocks 11 in the tire lateral direction being recessed inward in the tire lateral direction with respect to the outer edges E2 of the outer blocks 12 in the tire lateral direction). Meanwhile, the groove bottom protrusions 21 are provided to the shoulder grooves 20, and the broad width portions 21B are disposed at the above-mentioned positions. Thus, mud and the like can easily be discharged by the groove bottom protrusions 21, and the groove bottom protrusions 21 protect the groove bottoms of the shoulder grooves 20. As a result, cut-resistance performance can be improved.

As described above, when the positions of the outer edges E1 and E2 of the inner blocks 11 and the outer blocks 12 in the tire lateral direction are caused to differ from each other, a distance W1 from the tire equator CL to the outer edges E1 of the inner blocks 11 in the tire lateral direction is preferably set to from 88% to 96% of a distance W2 from the tire equator CL to the outer edges E2 of the outer blocks 12 in the tire lateral direction. By setting the positions of the outer edges E1 and E2 of the inner blocks 11 and the outer blocks 12 in the tire lateral direction as described above, a rock can easily be gripped as described above while securing block rigidity and obtaining sufficient cut-resistance performance, which is advantageous in providing traction performance and cut-resistance performance in a compatible manner. In this case, when the distance W1 is smaller than 88% of the distance W2, rigidity near the outer edges E2 of the outer blocks 12 in the tire lateral direction is reduced. As a result, traction at the time of driving on a rocky ground surface cannot be supported sufficiently, and there may be a risk of degrading cut-resistance performance. When the distance W1 is larger than 96% of the distance W2, the positions of the outer edges E1 of the inner blocks 11 in the tire lateral direction and the positions of the outer edges E2 of the outer blocks 12 in the tire lateral direction are substantially equal. Thus, the lengths of the shoulder grooves 20 supporting a shear force are secured, and mud performance is improved. However, the effect obtained by causing the positions of the outer edges E1 and E2 of the inner blocks 11 and the outer blocks 12 in the tire lateral direction to differ from each other (effect of grasping a rock and the like easily and improving traction performance) cannot be exerted sufficiently.

When the positions of the outer edges E1 and E2 of the inner blocks 11 and the outer blocks 12 in the tire lateral direction are caused to differ from each other as described above, the lengths of the inner blocks 11 and the outer blocks 12 in the tire lateral direction can be equal to each other, and the inner blocks 11 and the outer blocks 12 can be disposed in the tire lateral direction in a staggered manner. However, in the embodiment of the present technology, as illustrated in the drawings, the positions of the inner edges of the inner blocks 11 and the outer blocks 12 in the tire lateral direction is preferably aligned to cause the lengths of the inner blocks 11 and the outer blocks 12 in the tire lateral direction on the tread contact surface to differ from each other. In this case, a distance W3 from the tire equator CL to the inner edges of the inner blocks 11 and the outer blocks 12 in the tire lateral direction is preferably from 30% to 60% of the distance W2 from the tire equator CL to the ground contact edge E (the outer edges E2 of the outer blocks 12 in the tire lateral direction).

In order to effectively utilize the above-mentioned space formed by the different positions of the outer edges E1 and E2 of the inner blocks 11 and the outer blocks 12 in the tire lateral direction, a wall surface angle of side walls 11S of the inner blocks 11 on the outer side in the tire lateral direction with respect to the tire radial direction and a wall surface angle of side walls 12S of the outer blocks 12 on the outer side in the tire lateral direction with respect to the tire radial direction is preferably substantially the same angle (an angle difference is, for example, equal to or less than 10°). Further, as illustrated in FIG. 3, the side walls 11S of the inner blocks 11 preferably approaches the groove bottoms of the shoulder grooves 20 as being away from the ground contact surface of the inner blocks 11 and the side walls 11S of the inner blocks 11 and the groove bottoms of the shoulder grooves 20 is preferably flush with each other in the vicinity of the outer edges of the shoulder grooves 20 in the tire lateral direction.

The groove bottom protrusions 21 preferably has such size that the groove volume of the shoulder grooves 20 can be secured appropriately. Specifically, a projection height H of the groove bottom protrusions 21 is preferably from 1.0 mm to 3.0 mm. Further, a protrusion width of the groove bottom protrusions 21 (a protrusion width Wa of the narrow width portions 21A and a protrusion width Wb of the broad width portions 21B) preferably fall within a range of from 5% to 40% of a groove width Wg of the shoulder grooves 20. By optimizing shape of the groove bottom protrusions 21 as described above, discharge performance of mud and the like, driving performance on unpaved roads (particularly mud performance), and cut-resistance performance can be exerted in a well-balanced manner. In this case, when the projection height H of the groove bottom protrusions 21 is smaller than 1.0 mm, the projection amount from the groove bottoms is too small. Thus, the effect obtained by providing the groove bottom protrusions 21 cannot be exerted sufficiently. When the projection height H of the groove bottom protrusions 21 is larger than 3.0 mm, a ratio of the groove bottom protrusions 21 in the shoulder grooves 20 is increased. Thus, it is difficult for the shoulder grooves 20 to grip mud and the like. Further, the groove bottom protrusions 21 themselves are liable to be damaged. When the protrusion widths Wa and Wb of the groove bottom protrusions 21 are smaller than 5% of the groove width Wg of the shoulder grooves 20, the groove bottom protrusions 21 are too small. Thus, the effect obtained by the groove bottom protrusions 21 cannot be exerted sufficiently. When the protrusion widths Wa and Wb of the groove bottom protrusions 21 are larger than 40% of the groove width Wg of the shoulder grooves 20, the groove bottom protrusions 21 fill the most part of the groove bottoms of the shoulder grooves 20, and the entire groove bottoms of the shoulder grooves 20 are substantially raised. Thus, the volume of the shoulder grooves 20 is reduced, and mud and the like cannot be gripped sufficiently.

The protrusion width of the entire groove bottom protrusions 21 are set as described above. When the protrusion widths Wa and Wb of the narrow width portions 21A and the broad width portions 21B are caused to differ from each other, the protrusion width Wb of the broad width portions 21B is preferably set 1.5 times to 3.0 times as large as the protrusion width Wa of the narrow width portions 21A. By setting the protrusion widths Wa and Wb of the respective portions as described above, in the contact region (on the inner side in the tire lateral direction with respect to the outer edges E1 of the inner blocks 11 in the tire lateral direction), the protrusion width Wa of the narrow width portions 21A is appropriately small, and hence discharge of mud and the like is promoted effectively. Outside the contact region (on the outer side in the tire lateral direction with respect to the outer edges E1 of the inner blocks 11 in the tire lateral direction), the protrusion width Wb of the broad width portions 21B is sufficiently large, and hence cut-resistance performance is improved. Thus, discharge performance and cut-resistance performance can be provided in a highly accurate and compatible manner to a high degree. In this case, when the protrusion width Wb of the broad width portions 21B is smaller than 1.5 times the protrusion width Wa of the narrow width portions 21A, the difference between the narrow width portions 21A and the broad width portions 21B are excessively small. Thus, a difference in effects inside and outside of the contact region cannot be obtained effectively, and discharge performance of mud and the like and cut-resistance performance cannot be provided in a well-balanced and compatible manner. When the protrusion width Wb of the broad width portions 21B is larger than 3.0 times the protrusion width Wa of the narrow width portions 21A, a difference between the narrow width portions 21A and the broad width portions 21B is excessively large. Thus, a difference in effects inside and outside of the contact region is excessive, and any of discharge performance of mud and the like and cut-resistance performance cannot be obtained sufficiently.

The broad width portions 21B are provided outward in the tire lateral direction with respect to the outer edges E1 of the inner blocks 11 in the tire lateral direction. On the outer side in the tire lateral direction with respect to the outer edges E1 of the inner blocks 11 in the tire lateral direction, a length Lb of the broad width portions 21B in the tire lateral direction is preferably equal to or larger than 50% of a distance D from the outer edges E1 of the inner blocks 11 in the tire lateral direction to a terminal edge E3 of the outer blocks 12 (a laterally outermost edge of the side surface 12S of the outer blocks 12 on the outer side in the tire lateral direction). As described above, the length Lb of the broad width portions 21B is secured sufficiently, and excellent cut-resistance performance can be exerted effectively. In this case, when the length Lb is smaller than 50% of the distance D, the length of the broad width portions 21B cannot be secured sufficiently, and the effect of improving cut-resistance performance is limited. Note that, the length Lb and the distance D are the lengths obtained by projecting the respective portions in the tire lateral direction as illustrated in the drawings. Further, as illustrated in the drawings, the length Lb of the broad width portions 21B in the tire lateral direction is a length from the portions at which the groove bottom protrusions 21 start to increase in width (edge points of the narrow width portions 21A).

In the embodiment of the present technology, as described above, in addition to providing the groove bottom protrusions 21 to the shoulder grooves 20, zigzag shallow grooves 13 extending along the tire lateral direction in a bent manner is preferably formed in the side surfaces 11S and 12S of the inner blocks 11 and the outer blocks 12 on the outer sides in the tire lateral direction. As illustrated in the drawings, the shallow grooves 13 may extend over the side surfaces 11S and 12S, and include distal ends reaching the ground contact surface. By providing the shallow grooves 13 as described above, edge components are increased, which is advantageous in improving traction performance. Note that, a groove depth of the shallow grooves 13 is preferably set to, for example, from 1 mm to 3 mm. Further, when each of the shallow grooves 13 is formed into a zigzag shape, the number of bending points is preferably one to three.

In the embodiment of the present technology, in addition to the shallow grooves 13 described above, sipes 14 may be formed in the shoulder blocks 10. In the illustrated example, the sipes 14 include one ends communicating to the shallow grooves 13 and other ends communicating to the shoulder grooves 20. The sipes 14 may have a constant depth along the entire length, but the sipe depth is preferably shallower at the ends communicating to the shoulder grooves 20. By providing the sipes 14 as described above, the edge effect due to the sipes 14 can be obtained to improve traction performance, and at the same time, degradation of rigidity of the shoulder blocks 10, which is caused by providing the sipes 14, can be suppressed to maintain damage resistance of the blocks. Note that, when the depth of the sipes 14 is varied, in each of the sipes 14, a sipe depth of a relatively shallow portion may be set to, for example, from 0.1 times to 0.4 times as large as a sipe depth of a relatively deep portion. Note that, in the embodiment of the present technology, "sipe" is a fine groove having a groove width of from 0.5 mm to 1.5 mm and a groove depth of from 1.5 mm to 14.0 mm.

In the embodiment of the present technology, the shoulder regions on the outer surface of the tread portion 1 are configured as described above, and hence driving performance on unpaved roads, in particularly rock performance and mud performance, is improved while exerting excellent cut-resistance performance. Thus, a structure of a center region is not particularly limited. For example, in the illustrated example, a plurality of center blocks 30 in which V-shape cuts 31 and sipes 32 are provided. The center blocks 30 form pairs (block pairs 30') by intervening inclined grooves 40, which extend and are inclined with respect to the tire circumferential direction. The block pairs 30' are arrayed in the tire circumferential direction by intervening connecting grooves 50, which connect the inclined grooves 40 adjacent to each other in the tire circumferential direction and extend the tire lateral direction. With the structure of the center region as described above, the structure of the center region can further improve driving performance on unpaved roads. Even with center blocks arrayed differently from the illustrated example or even when land portions (ribs) that continuously extend in the tire circumferential direction are formed in the center region in place of the center blocks, the above-mentioned effect in the shoulder regions of the embodiment of the present technology can be obtained.

EXAMPLE

Sixteen types of pneumatic tire including Conventional Example 1, Comparative Examples 1 to 2, and Examples 1 to 13 are manufactured having a tire size of LT265/70R17, the basic structure illustrated in FIG. 1, and the tread pattern in FIG. 2 as a basic pattern under the following conditions as in Table and Table 2, that is, the shape of the groove bottom protrusions, the projection height H of the groove bottom protrusions, the positions of the broad width portions of the groove bottom protrusions, a ratio Wb/Wa of the protrusion width Wa and the protrusion width Wb of the broad width portions of the groove bottom protrusions, a ratio of the length Lb of the broad width portions of the groove bottom protrusions in the tire lateral direction with respect to the distance D from the outer edges of the inner blocks in the tire lateral direction to the terminal edge of the outer blocks (Lb/D×100%), a ratio of the distance W1 from the tire equator to the outer edges of the inner blocks in the tire lateral direction with respect to the distance W2 from the tire equator to the outer edges of the outer blocks in the tire lateral direction (W1/W2×100%), and the shape of the shallow grooves.

With regard to the item "Shape of groove bottom protrusions" in the Table 1 and 2, the case where the groove bottom protrusions are provided only on the laterally inner side with respect to the outer edges of the inner blocks in the tire lateral direction is described as "Only inner side," the case where the groove bottom protrusions are provided only on the laterally outer side with respect to the outer edges of the inner blocks in the tire lateral direction is described as "Only outer side," and the case where the groove bottom protrusions are provided from the laterally inner side to the laterally outer side with respect to the outer edges of the inner blocks in the tire lateral direction so as to cross the outer edges of the inner blocks in the tire lateral direction is described as "Inner and outer sides". With regard to the item "Positions of broad width portions" in Table 1 and 2, the case where the broad width portions are present on the tire lateral inner side with respect to the outer edges of the inner blocks in the tire lateral direction is described as "Inner side," and the case where the broad width portions are present on the laterally outer side with respect to the outer edges of the inner blocks in the tire lateral direction is described as "Outer side." Note that, in Conventional Example 1 and Comparative Example 1, the groove bottom protrusions themselves are provided only on the laterally inner side or the laterally outer side with respect to the outer edges of the inner blocks in the tire lateral direction, and hence the whole groove bottom protrusions have the same width as that of the broad width portions. With regard to the item "Shape of shallow grooves" in Table 1 and 2, the case where the shallow grooves extend straight in the tire lateral direction is described as "Straight line," and the case where the shallow grooves extend along the tire lateral direction in a bent manner is described as "Zigzag."

These sixteen types of pneumatic tires were evaluated for mud performance, rock performance, and cut-resistance performance by the evaluation methods described below, and the results are also shown in Table 1 and 2.

Mud Performance

The test tires were mounted on wheels having a rim size of 17×8.0, inflated to an air pressure of 450 kPa, and mounted on a test vehicle (pickup truck). Sensory evaluation on traction performance and starting performance was performed by a test driver on a muddy road surface. Evaluation results are expressed as index value with Conventional Example 1 being assigned the index value of 100. Larger index values indicate superior mud performance.

Rock Performance

The test tires were mounted on wheels having a rim size of 17×8.0, inflated to an air pressure of 450 kPa, and mounted on a test vehicle (pickup truck). Sensory evaluation on traction performance and starting performance was performed by a test driver on a rocky ground surface. Evaluation results are expressed as index value with Conventional Example 1 being assigned the index value of 100. Larger index values indicate superior rock performance.

Cut-Resistance Performance

After the evaluation of mud performance and rock performance, cut edge lengths of damages generated in the shoulder regions were measured. Evaluation results are expressed as index value with an inverse of Conventional Example 1 being assigned the index value of 100. Larger index values indicate smaller cut edge lengths and superior cut-resistance performance.

TABLE 1

| | Conventional Example 1 | Comparative Example 1 | Comparative Example 2 | Example 1 |
|---|---|---|---|---|
| Shape of groove bottom protrusions | Only inner side | Only outer side | Inner and outer sides | Inner and outer sides |
| Projection height H | 0.8 | 0.8 | 0.8 | 0.8 |
| Position of broad width portions | Inner side | Outer side | Inner side | Outer side |
| Wb/Wa | — | — | 1.2 | 1.2 |
| Lb/D × 100 | — | 0.4 | 1.0 | 0.4 |
| W1/W2 × 100 % | 0.87 | 0.87 | 0.87 | 0.87 |
| Shape of shallow grooves | Straight lines | Straight lines | Straight lines | Straight lines |
| Mud performance Index value | 100 | 95 | 98 | 102 |
| Rock performance Index value | 100 | 105 | 107 | 105 |
| Cut-resistance performance Index value | 100 | 103 | 108 | 103 |

| | Example 2 | Example 3 | Example 4 | Example 5 |
|---|---|---|---|---|
| Shape of groove bottom protrusions | Inner and outer sides | Inner and outer sides | Inner and outer sides | Inner and outer sides |
| Projection height H | 0.8 | 0.8 | 0.8 | 0.8 |
| Position of broad width portions | Outer side | Outer side | Outer side | Outer side |
| Wb/Wa | 1.2 | 1.2 | 1.2 | 1.2 |
| Lb/D × 100 | 0.4 | 0.4 | 0.4 | 0.4 |
| W1/W2 × 100 % | 0.87 | 0.88 | 0.94 | 0.96 |
| Shape of shallow grooves | Zigzag | Zigzag | Zigzag | Zigzag |
| Mud performance Index value | 105 | 104 | 106 | 107 |
| Rock performance Index value | 108 | 107 | 105 | 104 |
| Cut-resistance performance Index value | 103 | 105 | 109 | 111 |

TABLE 2

| | Example 6 | Example 7 | Example 8 | Example 9 |
|---|---|---|---|---|
| Shape of groove bottom protrusions | Inner and outer sides | Inner and outer sides | Inner and outer sides | Inner and outer sides |
| Projection height H | 0.8 | 0.8 | 0.8 | 0.8 |
| Position of broad width portions | Outer side | Outer side | Outer side | Outer side |
| Wb/Wa | 1.5 | 2.0 | 3.0 | 2.0 |
| Lb/D × 100 | 0.4 | 0.4 | 0.4 | 0.5 |
| W1/W2 × 100 % | 0.94 | 0.94 | 0.94 | 0.94 |
| Shape of shallow grooves | Zigzag | Zigzag | Zigzag | Zigzag |
| Mud performance Index value | 107 | 109 | 105 | 109 |
| Rock performance Index value | 105 | 105 | 105 | 107 |
| Cut-resistance performance Index value | 109 | 109 | 109 | 111 |

| | Example 10 | Example 11 | Example 12 | Example 13 |
|---|---|---|---|---|
| Shape of groove bottom protrusions | Inner and outer sides | Inner and outer sides | Inner and outer sides | Inner and outer sides |
| Projection height H | 0.8 | 1.0 | 2.0 | 3.0 |
| Position of broad width portions | Outer side | Outer side | Outer side | Outer side |
| Wb/Wa | 2.0 | 1.2 | 1.2 | 1.2 |
| Lb/D × 100 | 0.8 | 0.4 | 0.4 | 0.4 |
| W1/W2 × 100 % | 0.94 | 0.94 | 0.94 | 0.94 |
| Shape of shallow grooves | Zigzag | Zigzag | Zigzag | Zigzag |
| Mud performance Index value | 109 | 110 | 114 | 112 |

TABLE 2-continued

| | | | | | |
|---|---|---|---|---|---|
| Rock performance | Index value | 109 | 111 | 111 | 109 |
| Cut-resistance performance | Index value | 115 | 116 | 118 | 115 |

As can be seen from Table 1 and 2, Examples 1 to 13 had improved mud performance, rock performance, and cut-resistance performance as compared with Conventional Example 1. Meanwhile, in Comparative Example 1, the groove bottom protrusions are provided only on the outer side in the tire lateral direction with respect to the outer edges of the inner blocks in the tire lateral direction. Thus, rock performance can be improved, but the effect of improving mud performance cannot be obtained. In Comparative Example 2, the broad width portions are present on the inner side in the tire lateral direction with respect to the outer edges of the inner blocks in the tire lateral direction. Thus, almost any of mud performance, rock performance, and cut-resistance performance cannot be improved.

The invention claimed is:

1. A pneumatic tire, comprising:
a tread portion extending in a tire circumferential direction and having an annular shape;
a pair of sidewall portions disposed on both sides of the tread portion; and
a pair of bead portions disposed on an inner side of the sidewall portions in a tire radial direction,
wherein a plurality of shoulder blocks are provided in shoulder regions in the tread portion,
the plurality of shoulder blocks comprise inner blocks and outer blocks that have outer edges at different positions in a tire lateral direction on a tread contact surface,
the inner blocks and the outer blocks are disposed alternately in the tire circumferential direction,
groove bottom protrusions are disposed in shoulder grooves disposed between the inner blocks adjacent to each other in the tire circumferential direction and between the outer blocks adjacent to each other in the tire circumferential direction, the groove bottom protrusions project from a groove bottom of the shoulder grooves and extend from a laterally inner side to a laterally outer side in the tire lateral direction along the shoulder grooves over the positions of the outer edges of the inner blocks and over the positions of the outer edges of the outer blocks,
the groove bottom protrusions comprise narrow width portions having a relatively narrow protrusion width and broad width portions having a relatively broad protrusion width,
the broad width portions are present on the laterally outer side in the tire lateral direction with respect to the outer edges of the inner blocks,
a shallow groove extending along the tire lateral direction and reaching an inner end in the tire radial direction of an outer side surface in the tire lateral direction is disposed on the outer side surface in the tire lateral direction of each of the inner blocks and each of the outer blocks,
a sipe is provided in which one end of the sipe communicates with the inner end of the shallow groove in the tire lateral direction and an other end of the sipe communicates with one of the shoulder grooves, and
a shallow groove depth of the shallow groove is from 1.0 mm to 3.0 mm;
the inner blocks and the outer blocks each define side wall surfaces extending radially inward from a laterally outermost tread contact surface edge of the inner blocks and the outer blocks;
the side wall surfaces of the inner blocks and the side wall surfaces of the outer blocks each forming a linear surface from the laterally outermost tread contact surface edge of the inner blocks and the outer blocks to a distance radially inward along the side wall surfaces at least as great as a depth of the shoulder grooves at the laterally outermost tread contact surface edge of the inner blocks; and
a difference in angle of an inclination of the side wall surfaces of the inner blocks and an inclination of the side wall surfaces of the outer blocks is less than or equal to 10°.

2. The pneumatic tire according to claim 1, wherein the shallow groove is bent extending along the tire lateral direction.

3. The pneumatic tire according to claim 1, wherein a distance W1 from a tire equator to the outer edges of the inner blocks in the tire lateral direction is from 88% to 96% of a distance W2 from the tire equator to the outer edges of the outer blocks in the tire lateral direction.

4. The pneumatic tire according to claim 1, wherein a protrusion width Wb of the broad width portion is 1.5 times to 3.0 times as large as a protrusion width Wa of the narrow width portion.

5. The pneumatic tire according to claim 1, wherein a length Lb in the tire lateral direction of the broad width portions is equal to or larger than 50% of a distance D from the outer edges in the tire lateral direction of the inner blocks to terminal edges of the outer blocks.

6. The pneumatic tire according to claim 1, wherein a protrusion height H of the groove bottom protrusion is of from 1.0 mm to 3.0 mm.

7. The pneumatic tire according to claim 2, wherein a distance W1 from a tire equator to the outer edges of the inner blocks in the tire lateral direction is from 88% to 96% of a distance W2 from the tire equator to the outer edges of the outer blocks in the tire lateral direction.

8. The pneumatic tire according to claim 7, wherein a protrusion width Wb of the broad width portion is 1.5 times to 3.0 times as large as a protrusion width Wa of the narrow width portion.

9. The pneumatic tire according to claim 8, wherein a length Lb in the tire lateral direction of the broad width portions is equal to or larger than 50% of a distance D from the outer edges in the tire lateral direction of the inner blocks to terminal edges of the outer blocks.

10. The pneumatic tire according to claim 9, wherein a protrusion height H of the groove bottom protrusion is of from 1.0 mm to 3.0 mm.

* * * * *